United States Patent [19]

Balter et al.

[11] Patent Number: 4,885,947

[45] Date of Patent: Dec. 12, 1989

[54] MECHANISM FOR FEEDTHROUGH OF ROTARY MOTION TO A SEALED CHAMBER

[75] Inventors: Valentin Balter, Cupertino; Gerald H. Hooper, Soquel, both of Calif.

[73] Assignee: Huntington Mechanical Laboratories, Inc., Mountain View, Calif.

[21] Appl. No.: 286,612

[22] Filed: Dec. 19, 1988

[51] Int. Cl.[4] .............................................. F16J 15/50
[52] U.S. Cl. .......................................... 74/18.1; 74/63
[58] Field of Search ................. 74/18.1, 63, 570, 10 R

[56] References Cited

U.S. PATENT DOCUMENTS

| | | | |
|---|---|---|---|
| 1,277,193 | 8/1918 | Cassel | 74/63 |
| 4,403,521 | 9/1983 | f'Geppert | 74/18.1 X |
| 4,683,763 | 8/1987 | Balter | 74/18.1 |

Primary Examiner—Joseph Falk
Attorney, Agent, or Firm—David Pressman

[57] ABSTRACT

A rotary motion feedthrough mechanism for a sealed chamber comprises a first driven shaft (56) with a through opening (66) and a second driven shaft (96) moveably inserted into the through opening of the first shaft. At its rear end the first driven shaft has a recess (102) which is eccentric and inclined with respect to the axis of rotation of both shafts. The recess rotatingly supports one end of a conical sleeve (110), the other end of which is rotatingly supported in an inclined opening of an external sleeve (68) which is connected to a rotary drive unit through a sprocket (76) installed on the outer surface of the external sleeve. The end of the second drive shaft opposite to the eccentric opening of the first shaft is connected to an independent rotary motion feedthrough mechanism which is capable of transmitting rotation into a sealed space. When the mechanism is sealingly connected, e.g., to a vacuum chamber (46), it can transmit two independent rotations from outside of the chamber (46) to the first and second driven shafts. The first driven shaft (56) is rotated from the rotary drive unit, via the sprocket (76), and the external sleeve (68). Since the rear end of the conical sleeve is inclined, rotation of the external sleeve will cause orbital motions of the conical sleeve (110). The front end of the conical sleeve is installed in the eccentric recess (102) of the first driven shaft (56). Therefore, the latter will be driven into rotation. At the same time, the second shaft (96) is rotated from its independently installed rotary motion feedthrough mechanisms. In the second embodiment, the rotary motion feedthrough mechanism (94) is replaced by a linear motion feedthrough drive unit (138) and the second shaft (132) is moved axially within the first driven shaft (56). In a third embodiment, the second shaft is substituted by a tube (142) and is used for the supply of fluid, e.g., liquid nitrogen from an externally installed fluid feedthrough device (148).

20 Claims, 5 Drawing Sheets

4,885,947

MECHANISM FOR FEEDTHROUGH OF ROTARY MOTION TO A SEALED CHAMBER

BACKGROUND

1. Field of the Invention

The present invention relates to a motion transmitting device, particularly a motion transmitting device which incorporates a seal and can transmit rotary and/or linear motions from outside into a sealed chamber which is maintained under vacuum or pressure.

2. Cross Reference to Related Case

The device of the present invention is an improvement over the rotary motion feedthrough apparatus disclosed in U.S. Pat. No. 4,683,763 granted to applicant V. Balter on Aug. 4, 1987.

FIG. 1 —Background—Description of Prior Art

It is often desirable or necessary to rotate objects within a sealed chamber which has a pressure differential with the outside. For instance, when a test specimen, such as a semiconductor wafer, is mounted on a shaft in the chamber, it is often necessary to change the position of the sample. For this purpose, rotary motion feedthrough mechanisms have been known and used in the past. Specifically, the shaft extends from inside the sealed chamber to the outside via a rotary feedthrough connection so that shaft can be rotated from outside the chamber. The feedthrough connection is an airtight bearing which retains the pressure differential in the chamber. Such an arrangment is especially useful where it would be impractical to open the chamber merely to rotate the object.

One such prior-art arrangement is shown in U.S. Pat. No. 4,683,763 to V. Balter, 1987 and is illustrated in FIG. 1, which is a longitudinal sectional view. The mechanism includes a feedthrough shaft 10 which is to be rotated. Shaft 10 is rotatably mounted in a housing 14 of a vacuum chamber 16. The feedthrough mounting for shaft 10 includes a cap 18, a mounting element 19, which is attached to housing 14 of the vacuum chamber, and bearings 21 which rotatably support cap 18 on mounting element 19.

The mounting also includes a driver 20 with a stub shaft 22 having bearings 24 at one end thereof. Bearings 24 are received within a diametrical groove 26 formed at an end face of shaft 10. Driver 20 also includes a cylindrical member 28 mounted by a bearing 30 in the inner periphery of cap 18. Such inner periphery has a beveled surface so that cylindrical member 28 and stub shaft 22 wobble when the cap is rotated.

A bellows 32, which extends between mounting element 19 and an enlarged-diameter portion 34 of driver 20, provides the required seal.

When bearings 24 on the outer end of the stub shaft wobble, they move along a circular path surrounding the central axis of shaft 10. This causes shaft 10 to rotate in the direction of movement of bearings 24 on the driver. The cap can either be a manually rotated knob, a stepper motor, or a structural part for coupling the knob to a stepper motor. The mechanism of the type described above can be used, e.g., in manipulators for rotating samples within a vacuum chamber.

Although the above-described mechanism is simple and rugged in construction and reliably transmits rotary motion from outside to a driven shaft located within the sealed chamber, it nevertheless has some drawbacks. Specifically, this mechanism can transmit only a single rotary motion and is unsuitable for transmitting two or more independent rotary motions on two shafts, or a rotary motion combined with axial movement. In other words, the prior-art device is not universal and can provide only one degree of freedom of motion, i.e., rotation. Another disadvantage is that the device is completely closed and will not allow gas or liquid to flow from an outside source to the interior of the sealed chamber. Such fluid, however, may be required, e.g., for cooling.

OBJECTS AND ADVANTAGES OF THE INVENTION

It is accordingly an object of the invention to provide a rotary-motion feedthrough mechanism which is simple in construction and universal in use. Another object is to provide the above-mentioned mechanism which can transmit two or more independent motions from an outer space to within a sealed chamber. A further object is to provide a device of the above-mentioned type which can transmit rotary motion(s) in combination with translatory motion(s) and which is suitable for supplying fluids into the sealed chamber. A still further object is to provide a combined rotary and/or linear motion feedthrough mechanism which utilizes only metal seals that can be subjected to high or low temperatures. Further objects and advantages will become apparent after consideration of the ensuing description and the accompanying drawings.

REFERENCE NUMERALS USED IN THE DESCRIPTION AND DRAWINGS

Figure 2:
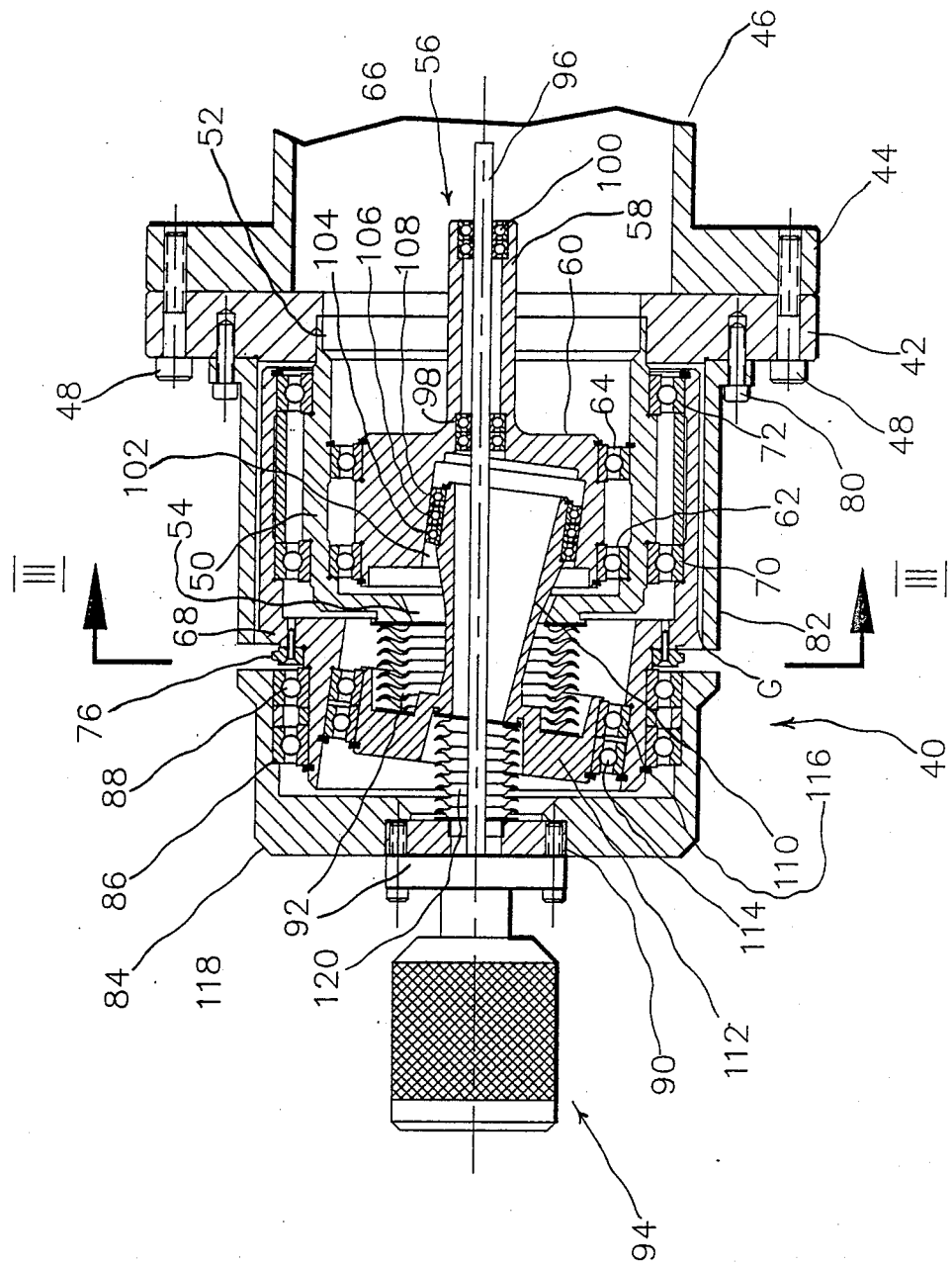
FIG. 2 is a longitudinal sectional view of a rotary motion feedthrough device of one embodiment of the invention.
Figure 3:
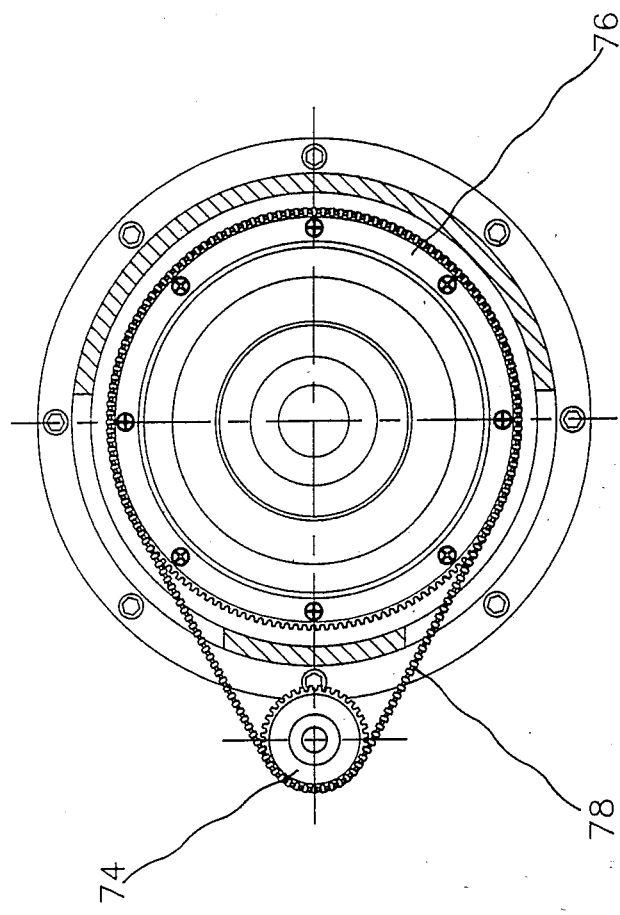
FIG. 3 is a sectional view along lines III—III of FIG. 2.

10—driven shaft
14—housing of a vacuum chamber
16—vacuum chamber
18—cap
19—mounting element
20—driver
21—bearings
22—stub shaft
24—bearings
26—groove
28—cylindrical member
30—bearing
32—bellows
34—enlarged-diameter portion
40—rotary motion feed through device
42—mounting flange
44—flange portion
46—vacuum chamber
48—bolts
50—stationary cylindrical housing 52—recess
54—tapered hole
56—first driven shaft
58—small-diameter portion
60—large-diameter portion
62, 64—bearings
66—through opening
68—drive sleeve
70, 72—bearings
74, 76—sprockets
78—chain
80—bolts
82—external cup-shaped cylindrical housing
84—rear side of external housing
86, 88—bearings
90—recess
92—mounting flange
94—replaceable unit
96—second driven shaft
98, 100—bearings
102—eccentric opening
104, 106, 108—bearings
110—conical sleeve
112—rear end of sleeve
114, 116—bearings
118—first bellows
120—second bellows
130—feedthrough with axial movability
132—sliding rod
138—linear drive unit
140—feedthrough with fluid passage
142—tube
148—fluid feedthrough device
G—gap FIGS. 2 and 3—Rotary Motion Feedthrough Device for Two Independent Rotary Motions A feedthrough mechanism or device of the present invention is broadly denoted by reference numeral 40 (FIG. 2) and includes a mounting flange 42 for attachment to a flange mounting portion 44 of a vacuum chamber 46, e.g., by bolts 48. Vacuum chamber 46 may be designed for treating a chemical or semiconductor specimen (not shown) or for measuring its properties in a vacuum.

Mounting flange 42 rigidly supports a stationary cylindrical housing 50, which may be inserted into a recess 52 of mounting flange 42 and welded thereto. Housing 50 has a cup-shaped configuration with a tapered hole 54 in its bottom (left) side. Located within housing 50 is a first driven shaft 56 which is hollow and has a first or a small-diameter portion 58 and a second or a large-diameter portion 60. Large diameter portion 60 is rotatingly supported within housing 50 by bearings 62 and 64. Shaft 56 has a through opening 66.

Stationary cylindrical housing 50 rotatingly supports an external drive sleeve 68 which rotates on bearings 70 and 72. Bearings 70 and 72 are in turn mounted on the outer side of housing 50. Drive sleeve 68 is rotated from a drive source (not shown), e.g., through sprockets 74 and 76 and chain 78. Sprocket 76 is fixed to external sleeve 68.

Sleeve 68 is surrounded by an external cup-shaped cylindrical housing 82 which is bolted by bolts 80 to mounting flange 42 and which forms a gap G with the outer surface of sleeve 68. On its rear side 84, housing 82 has a recess 90 for a mounting flange 92 of a replaceable unit 94. Sleeve 68 is additionally supported in housing 82 by means of bearings 86 and 88 located inside the housing. Depending on the purpose of rotary motion feedthrough mechanism 40, unit 94 may comprise either another feedthrough device, or a fluid-transmitting feedthrough device. In the embodiment illustrated in FIGS. 2 and 3, replaceable unit 94 is a prior-art rotary motion feedthrough device 12 of the type shown in FIG. 1. Output shaft 10 of device 12 is connected through a coupling (not shown) with a second driven shaft 96 which passes through opening 66 of first driven shaft 56 and is installed in it by bearings 98 and 100.

Large diameter portion 60 of first driven shaft 56 has an opening 102, the longitudinal axis of which is inclined to the common axis of concentric driven shafts 56 and 96. In addition, opening 102 is eccentric with respect to the above-mentioned axis of rotation of shafts 56 and 96. Installed on bearings 104, 106, and 108 and within inclined eccentric opening 102 is a hollow conical sleeve 110 which embraces the end of second driven shaft 96 opposite to vacuum chamber 46. Conical sleeve 110 passes through tapered hole 54 and its rear end is supported by bearings 114 and 116 in sleeve 68.

For sealing the interior of vacuum chamber 46 against penetration of air from the atmosphere, device 40 employs a pair of bellows. A first bellows 118 embraces sleeve 110 and is installed between stationary cylindrical housing 50 and the rear end of sleeve 110, while a second bellows 120 embraces the rear end of second driven shaft 96 and is installed between mounting flange 92 and sleeve 110.

Thus, the rotating parts of the device are the following: an output element (not shown) of replaceable drive unit 94, second driven shaft 96, drive sleeve 68, and first driven shaft 56. Mounting flange 42, cup-shaped cylindrical housing 82, bellows 114, bellows 116, conical sleeve 110, and mounting flange 92 do not rotate, except that conical sleeve 110 executes orbital motions which will be described below.

Operation of the Feedthrough Device of FIGS. 2 and 3

Figure 1:
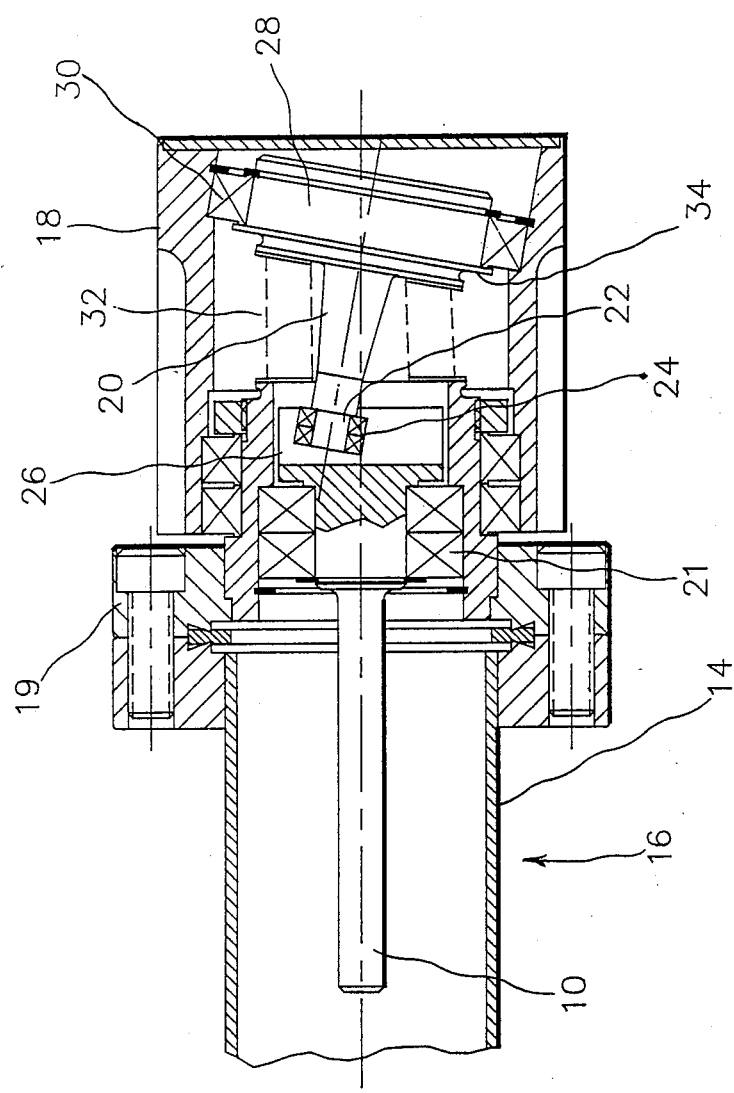
FIG. 1 is a longitudinal sectional view of a prior-art rotary motion feedthrough device.

Assume that first driven shaft 56 is connected to a first sample holder (not shown) and second driven shaft 96 is connected to a second sample holder (not shown). Assume also that both samples must be rotated simultaneously at different speeds and/or in different directions with respect to an electron beam source, or a similar source of energy for treating samples in a vacuum. The rotary motion feedthrough device of the embodiment shown in FIGS. 2 and 3 fulfills this task and operates as follows:

Replaceable drive unit 94, which in the illustrated case is the feedthrough apparatus of the type shown in FIG. 1, is driven into rotation by rotating cap 18 manually or from a programmed device (not shown) through a stepper motor (not shown). Since second driven shaft 96 is connected directly to output shaft 10 of drive unit 94, the second output shaft will be rotated on bearings 98 and 100 within first driven shaft 56 in a given direction and at a given speed from unit 94. During rotation, vacuum chamber 46 will remain sealed by second bellows 120. Simultaneously, sleeve 68 is rotated from a stepper motor (not shown) via sprockets 74 and 76 and chain 78. Since sprocket 76 is rigidly connected to sleeve 68, the latter will begin to rotate on bearings 86 and 88, and bearings 70 and 72. Because of the eccentricity of opening 102 and the inclination of conical sleeve 110 with respect to the axis of sleeve 68, rotation of the latter will cause planetary motions of conical sleeve 110. Sleeve 110 will thus describe, during its movement, a conical body of rotation having an apex at the side of rear end 112 of sleeve 110 and the base of the cone at large-diameter portion 60 of shaft 56. Due to the eccentricity of portion 60 of shaft 56, the planetary motion of sleeve 110 will cause shaft 56 to rotate in the same direction as the sleeve and with a 1:1 ratio. As a result, shaft 56 will rotate at the given speed. Vacuum chamber 46 will remain sealed by first bellows 118.

Thus it has been shown that the device of FIGS. 2 and 3 provides transmission of two independent rotary motions from separate external drive sources into a sealed chamber. The device is simple in construction and universal in operation.

Figure 4:
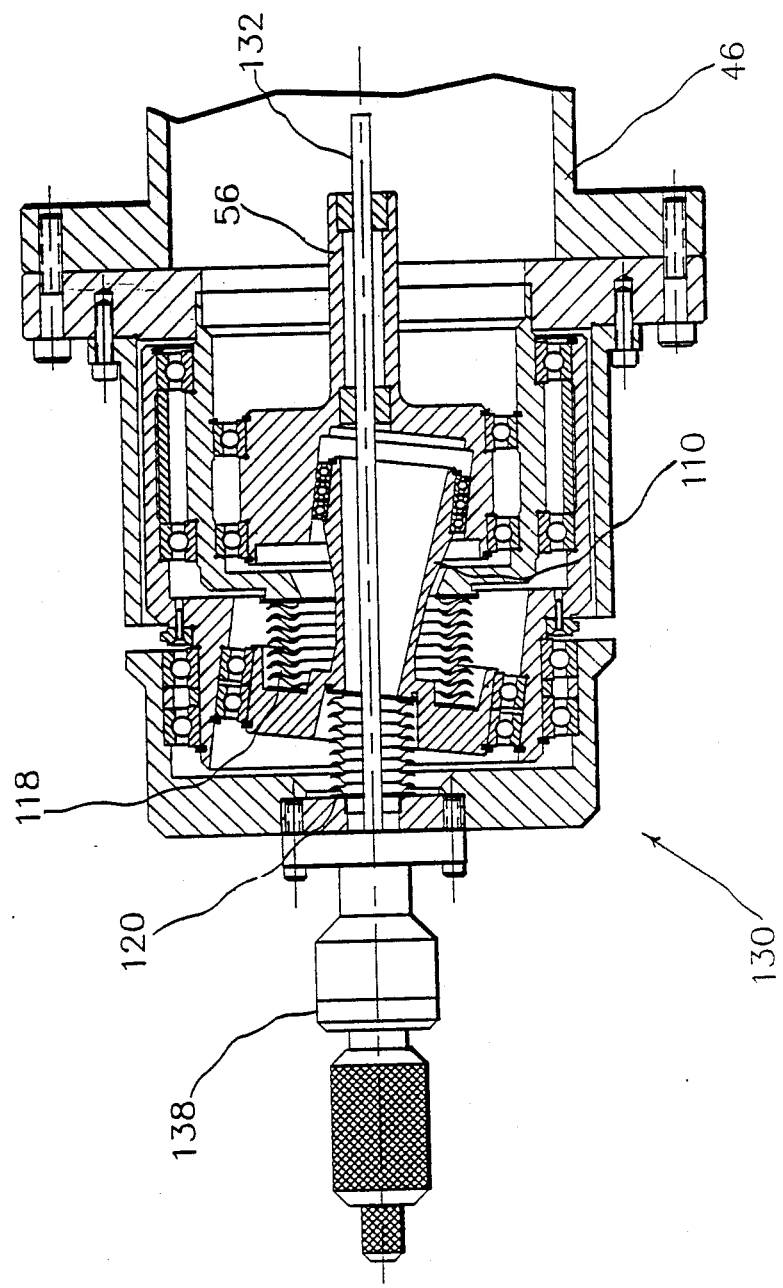
FIG. 4 is a longitudinal sectional view of a rotary motion device according to another embodiment which incorporates a rotary motion with a linear motion.

FIG. 4—Description and Operation of Rotary Motion Feed-Through Apparatus for Combined Linear and Rotary Motions A rotary motion feedthrough apparatus 130 is also shown in FIG. 4 and is generally the same as the one shown in FIG. 3, except that it can transmit rotary and translatory motions into a vacuum chamber 132. Those parts of apparatus 130 which are identical to those of apparatus 40 are designated by the same reference numerals.

Apparatus 130 differs from apparatus 40 in that, instead of second drive shaft 96, it has a sliding rod 132. Rod 132, similar to second driven shaft 96, passes through conical sleeve 110 and hollow shaft 56 into chamber 46. The end of rod 132 opposite to chamber 46 is connected to an axial drive unit 138, such as a Model VF-108 micrometric linear movement device produced by Huntington Mechanical Laboratories, Inc., Mountain View, Calif.

Bellows 118 and 120 fulfill the same functions as in apparatus of FIG. 3.

In operation, shaft 56 is rotated via sprockets 74 and 76 in the same manner as in apparatus 40 of FIG. 2. At the same time, linear motion can be transmitted to rod 132 from drive unit 138. The end of rod 132, which is located in vacuum chamber 46, may carry a sample (not shown) which is accurately moved in the axial direction of rod 132 by the required distance with respect to an electron beam gun or a similar sample treatment device (not shown) which is located in vacuum chamber 46. Thus apparatus 130 provides two combined motions, i.e., rotation of shaft 56 and linear motion of rod 132. The apparatus is compact, simple in construction, and reliable in operation.

Figure 5:
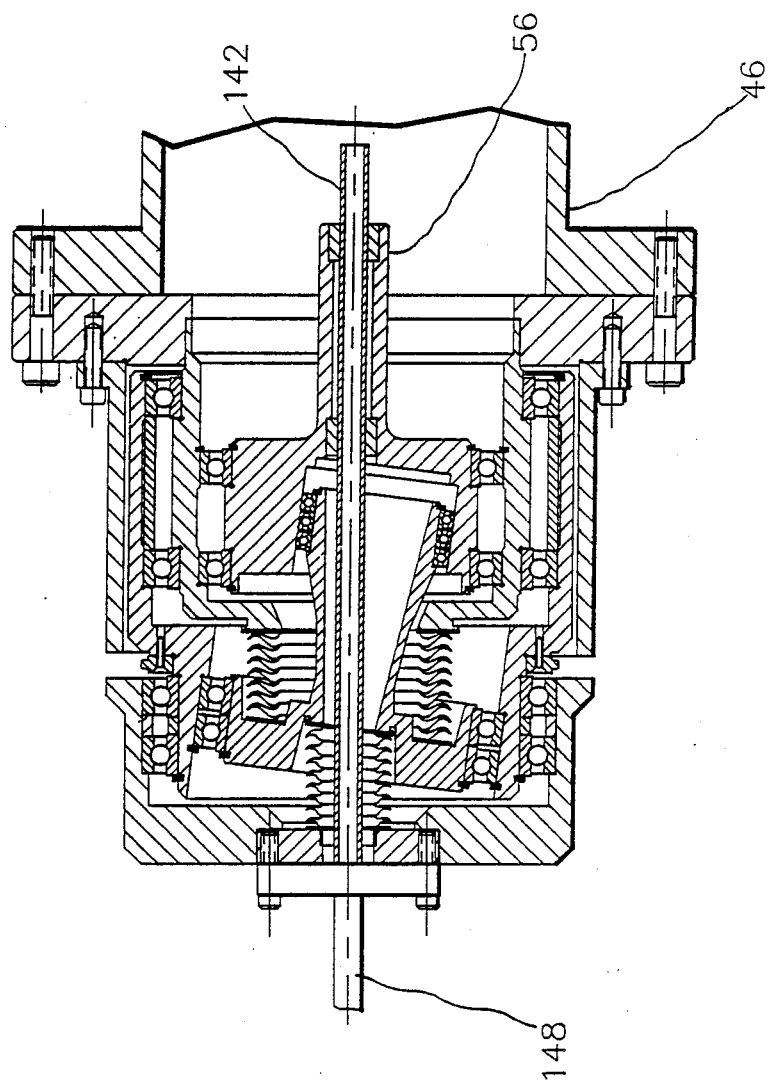
FIG. 5 is a longitudinal sectional view of a rotary motion device which can supply fluid into a sealed chamber.

FIG. 5—Description and Operation of Rotary Motion Feedthrough Apparatus Combined with Fluid Feedthrough A rotary motion feedthrough apparatus 140 shown in FIG. 5 is generally the same as the one shown in FIG. 4, except that it combines rotary motions with fluid feedthrough. For this purpose, rod 132 is replaced by a tube 142. One end of tube 142 is open into chamber 46, while the opposite end of tube 142 is connected to a source (not shown) of supply of liquid or gas, e.g., liquid nitrogen, via a fluid feedthrough device of the FT-191 type type produced by Huntington Mechanical Laboratories, Inc., Mountain View, Calif.

In operation, shaft 56 is rotated via sprockets 74 and 76 in the same manner as in apparatus 40 of FIG. 2. At the same time, a fluid, such as liquid nitrogen, is supplied to chamber 46 via fluid feedthrough device 148 in the direction of the arrows in FIG. 5. The device of FIG. 5 is shown with a stationary tube only by way of example. Tube 142 can also be rotated from a rotary motion feedthrough device of the type shown at 40 in FIG. 2. At the same time, the interior of the hollow rotating tube can be used for the supply of liquid nitrogen or a similar cooler via a fluid feedthrough device 148 (FIG. 5). In that case device 148 will be sealingly coupled to the rear end of rotary feedthrough device 40. Many other combinations are possible.

SUMMARY, RAMIFICATIONS, AND SCOPE

Thus it has been shown that the rotary motion feedthrough device of the invention is simple in construction, universal in use, can transmit from an outer space to the sealed chamber two or more independent motions, can transmit rotary motion(s) in combination with translatory motion(s), and is suitable for supplying fluids from an external source into a sealed chamber. The invention also provides a combined rotary and/or linear motion feedthrough mechanism which utilizes only metal seals that can be subjected to high or low temperature.

Although the invention has been shown and described in the form of specific embodiments, it is understood that its parts, materials and configurations were given only as examples, and that many other modifications of the combined rotary motion feedthrough device are possible. For example, more than two rotary motion feedthrough devices can be connected in series for transmitting more than two rotary motions. More than two linear motion feedthrough devices can be connected in series for transmitting more than two linear motions into a vacuum chamber. In other words, rotary feedthrough devices, linear feedthrough devices, and fluid feedthrough devices can be connected in series in any required combinations and quantities. Although the invention has been described and illustrated for use in a high vacuum, the same principle can be used for transmitting motions into a high-pressure chamber, or for manipulation of radioactive or hazardous substances within a nonpressurized sealed chamber. The fluid feedthrough can be used for the supply of both liquid or gaseous media. Therefore the scope of the invention should be determined, not by the examples given, but by the appended claims and their legal equivalents.

We claim:

1. A mechanism for feedthrough of rotary motion into a sealed chamber, comprising:

a first driven member having an axis of rotation, a through opening coaxial to said axis of rotation, and a recess eccentric with respect to said axis of rotation;

a second driven member inserted into said through opening so that it can move with respect to said opening;

a hollow body which has a central opening, a first end, and a second end, said first end being rotatingly inserted into said eccentric recess;

first driving means which is coupled to said second end of said hollow body for causing orbital motions of the latter;

a stationary housing which encloses said first driven member, said second driven member, and said hollow body;

first sealing means for sealing a space within said stationary housing;

second driving means for driving said second driven means for said movement with respect to said first driven member; and second sealing means for sealing the space within said hollow body, said first and second driving means being located outside of said sealed spaces.

2. The mechanism of claim 1 wherein a central axis of said eccentric recess is inclined with respect to said axis of rotation of said first driven member, and said hollow body is a made in the form of a conical sleeve having its larger diameter at said first end thereof.

3. The mechanism of claim 1 wherein said first and said second sealing means are bellows.

4. The mechanism of claim 1 wherein said first driving means comprise a rotary drive means, an external sleeve rotatingly installed on said stationary housing and driven into rotation from said rotary drive means, said external sleeve having an opening, the central axis of which is inclined with respect to said axis of rotation of said first driven member, said inclined opening rotatingly supporting said second end of said hollow body, so that when said external sleeve is rotated, said hollow body executes orbital motions which cause rotation of said first driven member.

5. The mechanism of claim 1 wherein said second drive means is a rotary motion feedthrough mechanism capable of transmitting rotation to a sealed space.

6. The mechanism of claim 1 wherein said second drive means is a linear motion feedthrough mechanism capable of transmitting a linear motion into a sealed space.

7. The mechanism of claim 1, further including an outer casing having mans for attachment to a vacuum chamber and an inner diameter greater than the outer diameter of said external sleeve.

8. A mechanism for feedthrough of rotary motion into a sealed chamber, comprising:
a driven member having an axis of rotation, a through opening coaxial to said axis of rotation, and a recess eccentric with respect to said axis of rotation;
a tubular member inserted into said through opening;
a hollow body which has a central opening, a first end, and a second end, said first end being rotatingly inserted into said eccentric recess;
driving means coupled to said second end of said hollow body for causing orbital motions of the latter;
a stationary housing which encloses said driven member, said tubular member, and said cylindrical body;
first sealing means for sealing a space within said stationary housing;
a source of fluid supply connected to said tubular member for the supply of fluid therethrough; and
second sealing means for sealing a space within said hollow body, said driving means and said source of fluid supply being located outside of said sealed spaces.

9. The mechanism of claim 8 wherein said eccentric recess of said driven member has a central axis which is inclined with respect to said axis of rotation of said driven member, and said hollow body is made in the form of a conical sleeve having its larger diameter at said first end thereof.

10. The mechanism of claim 8 wherein said first and second sealing means are bellows.

11. The mechanism of claim 8 wherein said driving means comprise a rotary drive means, an external sleeve rotatingly installed on said stationary housing and driven into rotation from said rotary drive means, said external sleeve having an opening the central axis of which is inclined with respect to said axis of rotation of said first driven member, said inclined opening rotatingly supporting said second end of said hollow body, so that when said external sleeve is rotated, said hollow body executes orbital motions which cause rotation of said driven member.

12. The mechanism of claim 8, further including an outer casing which has means for attachment to a vacuum chamber and an inner diameter greater than the outer diameter of said external sleeve.

13. A mechanism for feedthrough of a rotary motion into a sealed chamber, comprising:
a first driven shaft having an axis of rotation, a front portion, a rear portion, a through opening coaxial to said axis of rotation, and a recess eccentric and inclined with respect to said axis of rotation in said rear portion;
a second driven shaft inserted into said through opening so that it can move with respect to said opening;
a conical sleeve which has a central opening, a first end and a second end, said first end being rotatingly inserted into said inclined eccentric recess;
first driving means which is coupled with said second end of said conical sleeve for causing orbital motions of the latter;
a stationary housing which encloses said first driven shaft, said second driven shaft, and said conical sleeve;
first sealing means for sealing a space within said stationary housing;
second driving means for driving said second driven shaft for said movement with respect to said first driven shaft; and
second sealing means for sealing a space within said conical sleeve, said first and second driving means being located outside of said sealed spaces.

14. The mechanism of claim 13 wherein said first and said second sealing means are bellows.

15. The mechanism of claim 13 wherein said first driving means comprises rotary drive means, an external sleeve rotatingly installed on said stationary housing and driven into rotation from said rotary drive means, said external sleeve having an opening, the central axis of which is inclined with respect to said axis of rotation of said first driven shaft, said inclined opening rotatingly supporting said second end of said conical sleeve, so that when said external sleeve is rotated, said conical sleeve executes orbital motions which causes rotation of said first driven shaft.

16. The mechanism of claim 13 wherein said second drive means is a rotary motion feedthrough mechanism capable of transmitting rotation to a sealed space.

17. The mechanism of claim 13 wherein said second drive means is a linear motion feedthrough mechanism capable of transmitting a linear motion into a sealed space.

18. The mechanism of claim 13, further including an outer casing which has means for attachment to a vacuum chamber and has an inner diameter greater than the outer diameter of said external sleeve.

19. The mechanism of claim 13 wherein said external sleeve is rotatingly supported on said stationary housing and by means of ball bearings, and wherein said second end of said conical sleeve is rotatingly supported in said inclined opening of said external sleeve by means of ball bearings.

20. The mechanism of claim 13 wherein said external sleeve has a sprocket on its outer surface, said sprocket being connected to said rotary drive means through a sprocket chain.

* * * * *